United States Patent Office 3,573,235
Patented Mar. 30, 1971

3,573,235
POLYMERIZATION OF ACRYLONITRILE IN A CONCENTRATED SOLUTION OF ZINC CHLORIDE COMPRISING THE USE OF ZINC SULFITE AS THE REDUCING AGENT OF A REDOX INITIATOR
Akira Yamamoto, Zenjiro Momiyama, Heiichiro Murakami, Kunio Nakaoji, and Tatsuhiko Shizuki, Ootsu, Japan, assignors to Toyo Boseki Kabushiki Kaisha, Osaka, Japan
No Drawing. Filed Sept. 22, 1969, Ser. No. 860,043
Int. Cl. C08f *1/08, 1/13, 3/76*
U.S. Cl. 260—8
6 Claims

ABSTRACT OF THE DISCLOSURE

A process for polymerizing acrylonitrile in a concentrated aqueous solution of zinc chloride in the presence of a redox polymerization initiator wherein zinc sulfite is used as the reducing agent.

---

This invention relates to improvements in the polymerization of acrylonitrile. More particularly this invention relates to the use of a special redox catalyst system in the polymerization, copolymerization or graft-copolymerization of acrylonitrile in an aqueous medium containing zinc chloride.

It is well known to use a redox type polymerization initiator in the homogeneous solution polymerization of acrylonitrile in a concentrated aqueous solution of zinc chloride. However, in such homogeneous solution polymerization, the viscosity of the polymerization system will rise with the progress of the polymerization. Therefore, it is necessary to carefully control the temperature of the polymerization system in order to avoid fluctuation of polymerization degree and coloration of the polymer. Therefore, the selection of the redox type polymerization initiator is naturally limited. Thus, in most cases, sodium sulfite or potassium sulfite is used as the reducing agent and a persulfate such as ammonium persulfate is used as the oxidizing agent. However when acrylonitrile is polymerized in a concentrated aqueous solution (polymerization reaction medium) of zinc chloride in the presence of such redox type polymerization initiator and when the polymerization medium is recovered and is repeatedly used, the viscosity of the polymer solution obtained in each polymerization operation or the polymerization conversion rate will often vary so much that there will be a defect that it will be difficult to obtain a polymer of substantially constant quality at all times. We have found that this phenomenon is due to the fact that, during the repeated use of the above mentioned polymerization medium, sodium ions or potassium ions liberated from sodium sulfite or potassium sulfite used as a reducing agent for the redox type polymerization initiator will gradually accumulate in the polymerization medium recovered for reuse, with a result of lowering the solubility of the oxidizing agent in the polymerization medium. Particularly, in the case of graft-copolymerization of acrylonitrile and casein by the use of a sodium sulfite (or potassium sulfite)-ammonium persulfate type redox polymerization initiator, the above mentioned accumulation of sodium or potassium ions in the polymerization medium will cause the lowering of the solubility not only of the oxidizing agent but also of casein in the polymerization system, so that there will occur various drawbacks that the graft-polymerization reaction is not conducted uniformly and the viscosity of the polymer solution is increased. Therefore in order to successfully reuse the recovered polymerization medium, it would be necessary to completely remove sodium ions or potassium ions accumulated in the recovered polymerization medium or to properly control them so as to be always at a constant concentration. However, it requires a very complicated operation and is very disadvantageous to the industry to completely remove such sodium ions or potassium ions or to control them so as to be always constant.

We have found that zinc sulfite which is almost insoluble in water can dissolve (to such a concentration practical enough for serving as a reducing agent for a redox type polymerization initiator) in a concentrated aqueous solution of zinc chloride or a concentrated aqueous solution of an inorganic salt consisting mainly of zinc chloride, and that zinc ions liberated from zinc sulfite are the same cations as zinc ions liberated from zinc chloride in the polymerization medium and therefore even if they are accumulated in the polymerization medium, such troubles encountered in the case where the above mentioned sodium ions or potassium ions are accumulated will never occur.

The feature of the present invention is therefore to use zinc sulfite as a reducing agent for a redox type polymerization initiator in homopolymerizing, copolymerizing or graft-polymerizing acrylonitrile in a concentrated aqueous solution of zinc chloride or in a concentrated aqueous solution of an inorganic salt consisting mainly of zinc chloride. As described above, zinc sulfite to be used as a reducing agent according to the present invention liberates the same cations as are liberated from zinc chloride forming the essential component of the polymerization medium. Therefore, even if they are accumulated in the polymerization medium, there will be no problem at all, the solubility of the oxidizing agent in the polymerization medium will not be adversely influenced and the polymerizing reaction will proceed quite satisfactorily. Therefore, in the present invention, it is not necessary to remove cations carried in the recovered polymerization medium from the reducing agent. Further, if a compound selected from the group consisting of zinc persulfate, zinc chlorate, chloric acid, persulfuric acid, ammonium persulfate and hydrogen peroxide is used as an oxidizing agent, undesirable metallic cations from the oxidizing agent will be able to be prevented from being carried in the polymerization medium for reuse.

The polymerization medium to be in the present invention is a concentrated aqueous solution of zinc chloride or a concentrated aqueous solution of an inorganic salt consisting mainly of zinc chloride. Preferably, the concentration of zinc chloride in said polymerization medium is from 40% by weight to the saturation. Further, the concentrated aqueous solution of an inorganic salt consisting mainly of zinc chloride is an aqueous solution containing more than 40% by weight of zinc chloride and a small amount of one more of inorganic salts selected from magnesium chloride and calcium chloride.

Zinc sulfite may be added and dissolved directly into the mentioned polymerization medium or may be formed in the polymerization medium by first adding and dissolving zinc oxide or zinc hydroxide into the mentioned polymerization medium and then blowing sulfur dioxide thereinto. More particularly, in the first method, zinc sulfite is added directly into the polymerization medium and is dissolved at a temperature of 0 to 100° C., preferably 10 to 90° C. This operation can be carried out in air or in an atmosphere of such inert gas as nitrogen. In the second method, zinc oxide or zinc hydroxide is added and dissolved into the polymerization medium and then an equivalent or more of sulfur dioxide is introduced therein so that zinc sulfite is formed in said polymerization medium. In case an exzcess of sulfur dioxide has been blown in, the excess of sulfite ions may be neutralized with a solution of zinc oxide or zinc hydroxide.

For the oxidizing agent to be used in combination with zinc sulfite to form a redox type polymerization initiator, any known oxidizing agent for a redox type polymerization initiator may be used, for example, hydrogen peroxide, persulfuric acid, halogenic acid, perhalogenic acid, perboric acid and organic peracid and their salts. Among these oxidizing agents, particularly desirable are zinc persulfate, zinc chlorate, chloric acid, persulfuric acid, ammonium persulfate and hydrogen peroxide. When zinc persulfate or zinc chlorate is to be used, it may be added and dissolved directly into the polymerization medium or may be formed in the polymerization medium by dissolving zinc oxide or zinc hydroxide into the polymerization medium and then adding persulfuric acid or chloric acid thereto.

The present invention may be applicable to the homopolymerization, copolymerization and graft-copolymerization of acrylonitrile. A monomeric material to be subjected to such polymerization should contain more than 50% by weight of acrylonitrile. Particularly, when the resulting polymer is to be formed into fibers, the monomeric material should be more than 80% by weight of acrylonitrile.

Examples of monomers to be copolymerized with acrylonitrile are acrylic acid and methacrylic acid and their esters and amide derivatives, such vinyl esters as vinyl acetate, vinyl pyridine, vinyl pyrrolidone, vinyl imidazole, allyl alcohol, allyl amine, vinyl and allyl sulfonic acid and their salts. Further, there can also be used any other monomer having an ethylenic unsaturation, copolymerizable with acrylonitrile and soluble in water or a concentrated aqueous solution of zinc chloride.

In conducting the polymerization, it is preferable to dissolve the monomeric material in the polymerization medium so that its concentration will be 3 to 15% by weight.

As trunk polymer to be used in the graft-polymerization, there can be mentioned gelatin, casein, zein, soybean protein, peanut protein, any other animal or vegetable protein or a derivative of such protein, cellulose, acetylated cellulose or starch or its derivative, a polyamide, for example, 1-, 3-, 4- or 5-nylon, copolymerized nylon, a synthetic polypeptide, polyvinyl alcohol, partially acetylated polyvinyl alcohol, polyvinyl pyrrolidone or any other natural or synthetic high molecular weight substance which can be dissolved or dispersed in a concentrated aqueous solution of zinc chloride.

The polymerization conditions such as polymerization temperature and polymerization time may vary depending on the particular polymerization system, the kind of the oxidizing agent and the molecular weight desired in the resulting polymer. However, generally, the polymerization may be conducted at a temperature of 0 to 60° C. for 2–24 hours.

Since the polymerization operation and its after-treatment is known per se (e.g. U.S. Pat. No. 3,104,154, etc.) and does not constitute the essential and novel feature of the present invention, no further detailed explanation thereabout will be required.

The invention will be explained in more detail by referring to the following examples wherein all parts and percentages are by weight unless otherwise specified.

EXAMPLE 1

9.83 parts of zincsulfite (2½ hydrate) were added to and dissolved in 290.17 parts of an aqueous solution of 60.48% zinc chloride while stirring at 60° C. for 30 minutes in an atmosphere of air. Then the solution was cooled to 25° C. The measured concentration of zinc sulfite in the solution was 2.40% (theoretical value 2.50%). A 60% aqueous solution of zinc chloride was added to this solution so that the concentration of zinc sulfite becomes 2.0%. When the vessel was then plugged and was left to stand at the room temperature, the concentration of zinc sulfite was 1.98% after 1 hour, 1.99% after 5 hours and 1.97% after 24 hours and therefore the stability of the solution was very high.

Then, 40 parts of a monomer mixture of acrylonitrile and methyl acrylate (weight ratio 95:5) were added and dissolved into 357.3 parts of a 60% aqueous solution of zinc chloride at 20° C. To this solution were added 53.9 parts of the above mentioned 60% aqueous solution of zinc chloride containing 2.0% zinc sulfite and 48 parts of a 60% aqueous solution of zinc chloride containing 1.25% ammonium persulfate with stirring. The polymerization was conducted by continuing the stirring at 20° C. for 2 hours. The resulting obtained polymer solution was deaerated at 50° C. for 15 hours. The viscosity of the polymer solution measured at 30° C. was 310 poises. The polymerization conversion rate was 99.3%. The intrinsic viscosity of the polymer measured in dimethylformamide at 30° C. was 1.60. Further, the above mentioned polymer solution was extruded into a coagulating bath consisting of a 28% aqueous solution of zinc chloride kept at −3 to 0° C. through a spinneret of 15 orifices of a diameter of 0.07 mm. The formed filaments were washed with water, then stretched 12 times the length in boiling water and were dried and wound up. The thus obtained fiber was of a dry tenacity of 3.20 g./d., dry elongation of 25.2%, wet tenacity of 3.06 g./d., wet elongation of 26.8% and monofilament fineness of 2.21 deniers.

Further, the polymer solution obtained by the above mentioned polymerizing method was poured into a large amount of distilled water. The precipitated polymer was separated by filtration. The residual monomer and low molecular weight polymer were removed from the filtrate. Then the filtrate was concentrated until the concentration of zinc chloride became 60%. The thus recovered polymerization medium was reused as a polymerization medium in another polymerization which is same as the above mentioned polymerizing method.

The solubility of ammonium persulfate (oxidizing agent) in the polymerization medium, the viscosity (at 30° C.) of the polymer solution, polymerization conversion rate, intrinsic viscosity (in dimethylformamide at 30° C.) of the polymer and quality of the fiber otbained by spinning the polymer solution under the same conditions as mentioned above are shown in the following table. Further, for comparison, the results in the case where the polymerization and the reuse of recovered polymerization medium were repeated in the same manner as in the above mentioned Example 1 except that sodium sulfite in an equivalent to zinc sulfite was used instead of zinc sulfite as a reducing agent for the redox type polymerization initiator are also mentioned in the same table.

| Number of reuses of polymerization medium | Reducing agent | Solubility of ammonium persulfate | Viscosity (poises) of the polymer solution | Polymerization conversion rate, percent | Intrinsic viscosity of the polymer | Fiber tenacity, g./d. Dry | Fiber tenacity, g./d. Wet |
|---|---|---|---|---|---|---|---|
| 1 | ZnSO$_3$ | High | 315 | 99.1 | 1.63 | 3.21 | 3.06 |
|   | Na$_2$SO$_3$ | do | 320 | 99.5 | 1.65 | 3.20 | 3.08 |
| 4 | ZnSO$_3$ | do | 308 | 99.4 | 1.58 | 2.34 | 3.08 |
|   | Na$_2$SO$_3$ | Low | >1,000 | 98.7 | 4.00 | (1) |  |
| 10 | ZnSO$_3$ | High | 313 | 99.3 | 1.61 | 3.19 | 3.08 |
|   | Na$_2$SO$_3$ | Quite low | (2) |  |  |  |  |

[1] Spinning was impossible.
[2] Polymerization was impossible.

As apparent from the above table, when sodium sulfite was used as a reducing agent, the solubility of ammonium persulfate (oxidizing agent) in the polymerization medium varied so much that the viscosity of the polymer solution, polymerization conversion rate, intrinsic viscosity of the polymer and tenacity of the fiber remarkably fluctuated until the spinning or polymerization became impossible. On the other hand, when wherein zinc sulfite was used as a reducing agent, even when the polymerization medium was recovered and repeatedly used, the solubility of ammonium persulfate, viscosity of the polymer solution, polymerization conversoin rate, intrinsic viscosity of the polymer and tenacity of the fiber did not substantially vary and were very stable.

EXAMPLE 2

4.46 parts of zinc oxide as dispersed in 39.9 parts of water were added to 300 parts of a 68% aqueous solution of zinc chloride at 90° C. and were dissolved therein while stirring for 30 minutes. Then the thus obtained solution was cooled to the room temperature and an equivalent of sulfur dioxide gas was passed therethrough to obtain an aqueous solution of zinc chloride of a zinc sulfite concentration of 2.25%. Then this solution was diluted with a 60% aqueous solution of zinc chloride to prepare an aqueous solution of zinc chloride of a zinc sulfite concentration of 2.0%. When this solution was left at the room temperature in a closed vessel, the concentration of zinc sulfite was 2.00% after 1 hour, 1.99% after 5 hours and 1.98% after 24 hours.

Then 40 parts of a monomer mixture of acrylonitrile and methyl acrylate (weight ratio 95/5) were added to 396.1 parts of a 61.4% aqueous solution of zinc chloride. Then 53.9 parts of a 60% aqueous solution of zinc chloride containing 2.0% zinc sulfite as prepared above and 10 parts of a 5.1% aqueous solution of persulfuric acid obtained by an ion-exchanging method from an aqueous solution of ammonium persulfate were added to the monomer solution. The mixture was stirred at 20° C. for 2 hours.

The viscosity measured at 30° C. of the thus obtained polymer was 298 poises and the polymerization conversion rate was 98.7%.

EXAMPLE 3

98 parts of an aqueous solution containing 50% zinc chloride and 10% magnesium chloride were warmed to 60° C. and 2 parts of zinc sulfite (2½ hydrate) were added thereto and dissolved therein while stirring for 15 hours in an atmosphere of nitrogen gas. The concentration of zinc sulfite in the resulting solution was 1.45% (the theoretical value 1.53%). On the other hand, 22.8 parts of acrylonitrile and 1.2 parts of methyl acrylate were dissolved in 229.3 parts of an aqueous solution containing 50% zinc chloride and 10% magnesium chloride. To this solution were added 46.3 parts of the above mentioned aqueous solution of zinc sulfite and 0.36 part of ammonium persulfate to conduct the polymerization at 20° C. for 2 hours. The viscosity at 30° C. of the thus obtained polymer solution was 270 poises and the polymerization conversion rate was 99.5%.

EXAMPLE 4

0.5 part of zinc oxide was added and dissolved in 99.5 parts of a 67% aqueous solution of zinc chloride. While this solution was kept at 10° C., 11.9 parts of an aqueous solution containing 10% persulfuric acid obtained by an ion-exchanging method from an aqueous solution of ammonium persulfate were gradually added with stirring to obtain a 60% aqueous solution of zinc chloride containing 1.39% zinc persulfate. Then a monomer mixture of acrylonitrile and acrylamide (weight ratio 95/5) was copolymerized by the same method as in Example 1 except that the thus prepared 60% aqeous solution of zinc chloride containing zinc persulfate was used instead of the 60% aqueous solution of zinc chloride containing ammonium persulate of Example 1. The viscosity at 30° C. of the thus obtained polymer solution was 340 poises and the polymerization conversion rate was 98.9%. The fiber obtained by spinning, stretching and drying in the same manner as in Example 1 was of a dry tenacity of 3.52 g./d., dry elongation of 25.8%, wet tenacity of 2.97 g./d., wet elongation of 27.6% and monofilament fineness of 2.20 d.

EXAMPLE 5

25 parts of acrylonitrile were added to 393.3 parts of a 60% aqueous solution of zinc chloride having dissolved therein 2.67% casein. As polymerization initiators, 11.7 parts of 60% aqueous solution of zinc chloride containing 2% zinc sulfite as prepared in the same manner as in Example 2, and 10 parts of 60% aqueous solution of zinc chloride containing 1.4% zinc persulfate as prepared in the same manner as in Example 6 were added thereto at the time of starting the polymerization, and respectively 35.6 and 25 parts of them were added thereto after 20 minutes after the polymerization was started. The polymerization was conducted at 20° C. for 2.5 hours.

The viscosity at 30° C. of the graft-polymer solution thus obtained was 288 poises, the polymerization conversion rate of acrylonitrile was 98.0% and the graft efficiency was 47.3%. The fiber obtained by spinning, stretching and drying in the same manner as in Example 1 was of a dry tenacity of 3.35 g./d., dry elongation of 26.0%, wet tenacity of 3.12 g./d., wet elongation of 27.9% and monofilament fineness of 1.97 d. and had a silky hand and luster.

EXAMPLE 6

15 parts of acrylonitrile were added to 246 parts of a 60% aqueous solution of zinc chloride having dissolved 2.67% casein. Further, 28 parts of a 60% aqueous solution of zinc chloride containing 1.93% zinc sulfite and 11 parts of a 60% aqueous solution of zinc chloride containing 0.86% zinc chlorate were added thereto and the polymerization was conducted at 20° C. for 4 hours.

The viscosity at 30° C. of the resulting graft-polymer solution was 200 poises, the polymerization conversion rate of acrylonitrile was 99% and the grafting efficiency was 42.5%.

What we claim is:

1. An improved method for homopolymerizing, copolymerizing or graft-polymerizing acrylonitrile in the presence of a redox type polymerization initiator in a concentrated aqueous solution of zinc chloride or an inorganic salt consisting mainly of zinc chloride, characterized by using zinc sulfite as a reducing agent for the above mentioned redox type polymerization initiator.

2. A method according to claim 1 wherein the monomeric material to be subjected to the polymerization contains at least 50% by weight acrylonitrile.

3. A method according to claim 1 wherein a protein is used as a trunk polymer for the graft polymerization with acrylonitrile.

4. A method according to claim 1 wherein the oxidizing agent to be used in combination with zinc sulfite for the redox type polymerization initiator is selected from the group consisting of zinc persulfate, zinc chlorate, chloric acid, persulfuric acid, ammonium persulfate and hydrogen peroxide.

5. A method according to claim 1 wherein the concentrated aqueous solution contains at least 40% by weight of zinc chloride.

6. A method according to claim 1 wherein the said concentrated aqueous solution contains at least 40% by weight of zinc chloride and further a small amount of one or more of inorganic salts selected from magnesium chloride and calcium chloride.

References Cited

UNITED STATES PATENTS

| | | | |
|---|---|---|---|
| 2,763,636 | 9/1956 | Davis | 260—88.7 |
| 2,847,405 | 8/1958 | Mallison | 260—85.5 |
| 3,104,154 | 9/1963 | Morimoto et al. | 260—8X |
| 3,287,307 | 11/1966 | Taniyama et al. | 260—88.7X |
| 3,320,221 | 5/1967 | Wishman et al. | 260—85.5 |
| 3,397,262 | 8/1968 | Stoy et al. | 260—29.6X |
| 3,479,312 | 11/1969 | Fujii et al. | 260—85.5X |

WILLIAM H. SHORT, Primary Examiner

H. SCHAIN, Assistant Examiner

U.S. Cl. X.R.

260—17, 17.4, 29.6, 85.5, 88.7, 857, 881, 882